(12) United States Patent
Trika et al.

(10) Patent No.: US 8,347,029 B2
(45) Date of Patent: Jan. 1, 2013

(54) SYSTEMS AND METHODS FOR FAST STATE MODIFICATION OF AT LEAST A PORTION OF NON-VOLATILE MEMORY

(75) Inventors: Sanjeev N. Trika, Hillsboro, OR (US); Debra Hensgen, Portland, OR (US); Han H. Chau, Portland, OR (US); Michael Johnston, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 11/966,826

(22) Filed: Dec. 28, 2007

(65) Prior Publication Data

US 2009/0172280 A1    Jul. 2, 2009

(51) Int. Cl.
   *G06F 12/00* (2006.01)
(52) U.S. Cl. .................. 711/112; 711/103; 711/143
(58) Field of Classification Search .............. 711/143, 711/103, 113, 144, 118, 112
   See application file for complete search history.

(56) References Cited

U.S. PATENT DOCUMENTS

| | | | | |
|---|---|---|---|---|
| 5,519,831 A | * | 5/1996 | Holzhammer | 714/22 |
| 6,272,033 B1 | * | 8/2001 | Watt | 365/49.1 |
| 6,304,946 B1 | * | 10/2001 | Mason, Jr. | 711/143 |
| 6,941,423 B2 | * | 9/2005 | Coulson | 711/141 |
| 7,010,645 B2 | * | 3/2006 | Hetzler et al. | 711/113 |
| 2005/0144396 A1 | * | 6/2005 | Eschmann et al. | 711/143 |

* cited by examiner

*Primary Examiner* — Matthew Bradley
(74) *Attorney, Agent, or Firm* — Pillsbury Winthrop Shaw Pittman LLP

(57) ABSTRACT

A method is provided for reducing the number of writes in a non-volatile memory (122). The method involves writing data in the non-volatile memory and determining a set of data from the data in the non-volatile memory to be written to a removable memory (126) that is operatively coupled to the non-volatile memory (e.g., a NAND memory). The method also involves writing the set of data to the removable memory (e.g., a hard disk) from the non-volatile memory. The method further involves writing a delineation marker (e.g., a sequence number) to the non-volatile memory specifying that the set of data has been written to the removable memory. Notably, the metadata of the data in the non-volatile memory comprises at least one marker set as a specific marker type (e.g., a valid marker and a dirty marker).

28 Claims, 7 Drawing Sheets

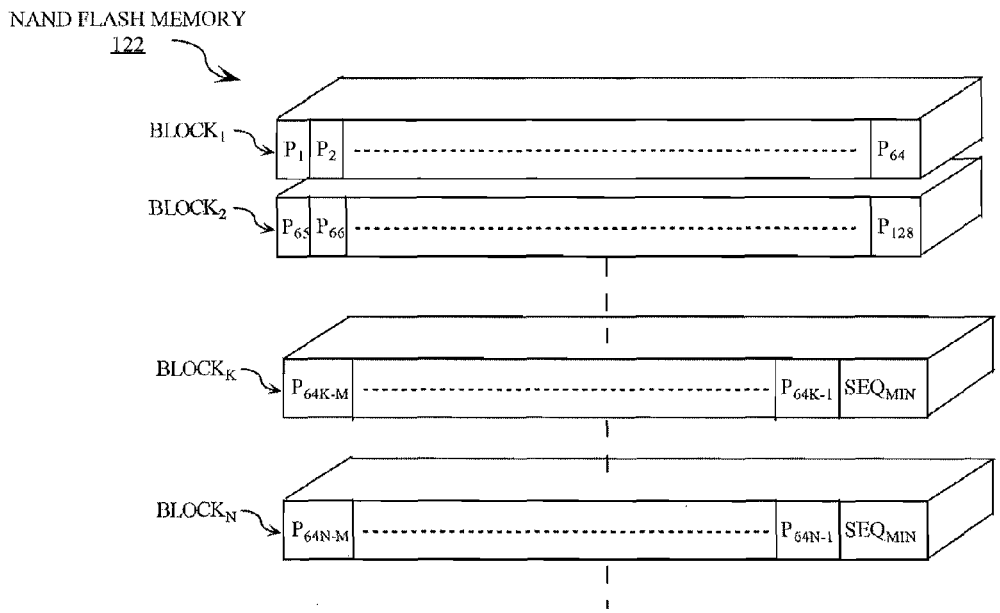
FIG. 2A
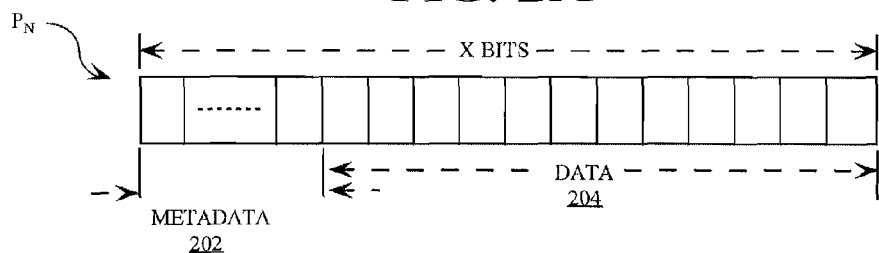
FIG. 2B
METADATA
202
| VALID OR INVALID MARKER 210 | DIRTY OR CLEAN MARKER 212 | PHYSICAL BLOCK (OR NAND) ADDRESS 214 | LOGICAL BLOCK (OR DISK) ADDRESS 216 | SEQUENCE NUMBER 218 |
|---|---|---|---|---|
FIG. 2C

SYSTEMS AND METHODS FOR FAST STATE MODIFICATION OF AT LEAST A PORTION OF NON-VOLATILE MEMORY

FIELD OF THE INVENTION

Embodiments of the invention concerns computing systems and methods for state modification (including the resetting) of all or a portion of non-volatile memory.

BACKGROUND

There are many types of computing systems known in the art. These conventional computing systems typically employ memory devices for data storage purposes. Such memory devices include, but are not limited to, non-volatile memory. The phrase "non-volatile memory" as used herein refers to a computer memory that can retain stored information even when powered off. Non-volatile memory generally comprises read-only memory, flash memory, optical disc drives, battery-backed up dynamic random access memory, disk-caches and solid-state-drives, and/or the like.

Data storage is one of the biggest performance bottlenecks on conventional computer systems. Write-Back disk-caching using non-volatile memory can significantly alleviate the performance bottleneck, while at the same time offering power-savings benefits. The phrase "write-back disk cashing" as used herein refers to a process of temporarily storing data in a write back cache (or memory device) of a computing device. Frequently accessed data resides in the write back cache after initial access and subsequent accesses to the same data may be made to the write back cache instead of a hard drive of a computing device.

There are scenarios such as dual-boots, disassociations, crashes and power-failures that can require changing the state of a portion or all of the write back cache in order to maintain data integrity. In particular, these scenarios may require changing the state to invalid or from dirty to clean. The remainder of this description will use the state change of invalidation as the representative state change, but the same method applies for other state changes. Write back cache state modification in non-volatile memory requires marking each non-volatile cacheline invalid in its metadata. The term "cacheline" as used herein refers to a unit (or block) of data that is transferred from a main memory of a computing system to a cache. The term "metadata" as used herein refers to information describing each unit of data. This cache invalidation is not an issue if the non-volatile memory offers fast write operations or the capability to rapidly overwrite metadata. However, writes to non-volatile memories (such as NOR and NAND flash memories) are slow and require writing a new copy of each cacheline in order to invalidate it. Such operations can take a relatively long time. For example, if a power failure occurs, then invalidating a large cache could require the user to wait for a relatively long period of time before the operating system can begin to load. As such, there is a need for an improved system and method for cacheline invalidation.

BRIEF DESCRIPTION OF THE DRAWINGS

Embodiments will be described with reference to the following drawing figures, in which like numerals represent like items throughout the figures, and in which:

FIG. 2A is a more detailed block diagram of the NAND flash memory shown in FIG. 1.

FIG. 2B is a schematic illustration of a page of the NAND flash memory of FIG. 2A.

FIG. 2C is a schematic illustration of metadata of the page of FIG. 2B.

DETAILED DESCRIPTION

Figure 1:
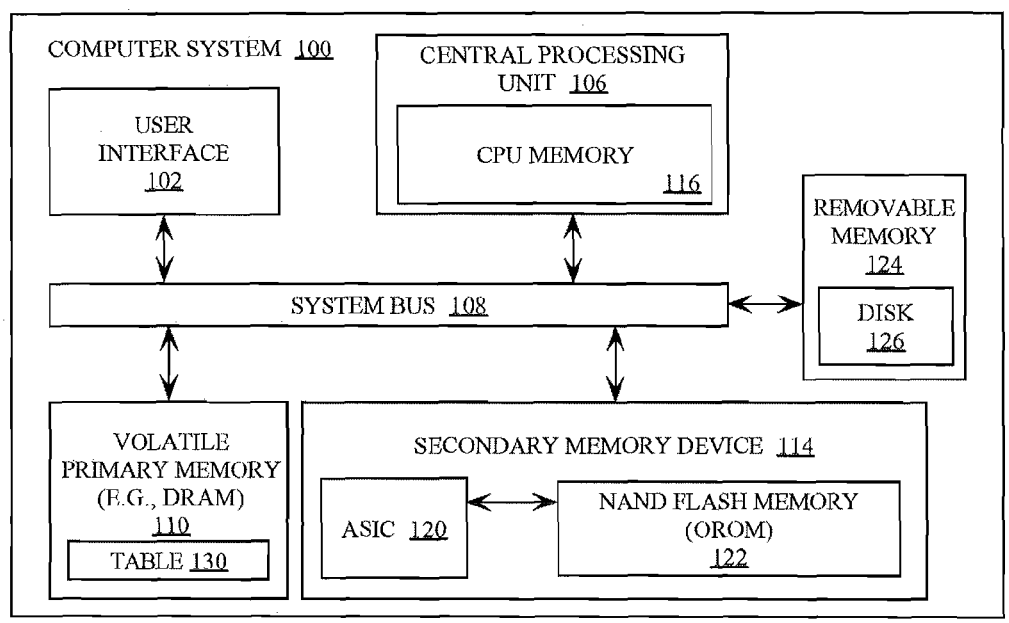
FIG. 1 is a block diagram of a computer system that is useful for understanding embodiments of the invention.

The inventions concern computer systems and methods for state modification (including the resetting) of all or a portion of non-volatile memory.

A computer system is a machine which manipulates data according to a list of instructions. Computer systems take numerous physical forms. A computer system could be based on comparatively tiny integrated circuits and are millions to billions of times more capable while occupying a fraction of the space. A computer system may be made small enough to fit into a wrist watch and be powered from a watch battery. Computer systems include personal computers in various forms as well as an embedded computer. Embedded computers could be small, simple devices that are often used to control other devices—for example, they may be found in machines ranging from fighter aircraft to industrial robots, digital cameras, and even children's toys.

Non-volatile memory (NVM) or non-volatile storage, is computer memory that can retain the stored information even when not powered. Examples of non-volatile memory include read-only memory, flash memory, most types of magnetic computer storage devices (e.g. hard disks, floppy disk drives, and magnetic tape), optical disc drives, disk-caches, solid-state-drives, and early computer storage methods such as paper tape and punch cards.

Non-volatile memory could be typically used for the task of secondary storage, or long-term persistent storage. Unlike non-volatile memory, random access memory (RAM) is a volatile form of memory, meaning that when the computer is shut down, anything contained in RAM is lost.

Removable memory (also known as removable storage) refers to memory on a device that could be removed from a computer system. Removable storage can be broken down into three categories, based on the technology used by the device to record and store data on the removable media. The first category is magnetic drives, which includes removable media storage such as floppy drives, hard drives, Zip and Jazz drives. The second category is optical drives, which is a collection of removable storage options such as CD-ROM, DVD, and Magneto-Optical Drives. The third category of removable storage includes flash memory storage options, which is also called solid state storage because the drives contain no moving parts.

The embodiments of the invention generally relate to a method for reducing the number of writes in a non-volatile memory (e.g., NAND memory, a disk-cache, and a solid-state-drive). The method comprises the steps of: writing data in the non-volatile memory; determining a set of data from the data in the non-volatile memory to be written to a removable memory (e.g., a hard disk); writing the set of data to the removable memory from the non-volatile memory; and writing a delineation marker (e.g., a sequence number) to the non-volatile memory specifying that the set of data has been written to the removable memory. Notably, the removable memory is operatively coupled to the non-volatile memory. The metadata of the data can comprise at least one marker set as a specific marker type (e.g., a valid marker and a dirty marker).

The embodiments of the invention also generally relate to a system implementing the above described method. The system is comprised of a removable memory and a non-volatile memory coupled to the removable memory. The system is also comprised of at least one processing device configured for (a) writing data in the non-volatile memory, (b) determining a set of data from the data in the non-volatile memory to be written to the removable memory, (c) writing the set of data to the removable memory from the non-volatile memory, and (d) writing a delineation marker to the non-volatile memory specifying that the set of data has been written to the removable memory.

The embodiment of the invention further relate to a method for reducing the number of writes in a non-volatile memory cache. The method generally includes the steps of: writing data in the non-volatile memory cache into N different regions; and writing delineation markers to given regions in the non-volatile memory. The delineation markers specify that data written to the N different regions up till the delineation markers are no longer valid. According to an aspect of the embodiment of the invention, N is equal to one and the delineation markers are sequence numbers. According to another aspect of the embodiment of the invention, different delineation markers are used for each of the N different regions or the same delineation marker is used for all N different regions.

The embodiments of the invention relate to a method for state modification (including resetting) of all or a portion of non-volatile memory (e.g., NAND memory, a disk-cache, and a solid-state-drive) of a computer system. The method generally includes the steps of: retaining a first minimum sequence number $SEQ_{MIN1}$ equal to a sequence number of a page $P_N$ of the non-volatile memory containing data copied therefrom; copying data contained in a page $P_M$ of the non-volatile memory into removable memory (e.g., a hard disk), the page $P_M$ having metadata comprising a sequence number greater than the first minimum sequence number $SEQ_{MIN1}$; and subsequent to the copying step, retaining a second minimum sequence number $SEQ_{MIN2}$ equal to the sequence number contained in the metadata of the page $P_M$. Notably, the metadata of the page $P_M$ can comprise at least one of a valid marker and a dirty marker.

The method can also include the steps of: repeating the copying step for all pages Ps having metadata comprising at least one of a sequence number greater than the second minimum sequence number $SEQ_{MIN2}$, a valid marker, and a dirty marker; and retaining a third minimum sequence number $SEQ_{MIN3}$ equal to the sequence number contained in the metadata of a last page of the pages Ps having data copied therefrom.

The method can further include the step of resetting all volatile data structures using the second minimum sequence number $SEQ_{MIN2}$. This resetting step involves obtaining translation information for a plurality of pages Ps having metadata including a valid marker and a sequence number greater than the second minimum sequence number $SEQ_{MIN2}$. The translation information comprises logical block address information for each page Ps and corresponding physical block address information for each page Ps.

The invention wilt now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the invention can be utilized. In this regard, it should be understood that the methods of the present invention can be utilized in any application where (a) non-volatile memory needs to be reset in a timely fashion, (b) a disk-cache needs to be invalidated, (c) a solid-state disk (SSD) needs to be reset, and (d) a cacheline needs to be identified. Such applications include, but are not limited to, mass storage card applications, digital camera applications, mobile phone applications, and general purpose computer applications. Accordingly, the methods of the present invention will now be described in relation to one such application, namely, the general purpose computer system application.

Referring now to FIG. 1, there is provided a block diagram of a computer system 100 that is useful for understanding embodiments of the present invention. The computer system 100 may be a desktop personal computer system, a laptop personal computer system, a personal digital assistant, a mobile computing device, or any other general purpose computer processing device. The computer system 100 is configured to reset at least a portion of non-volatile memory after a power failure. The computer system 100 is also configured to synchronize data stored in non-volatile memory and removable memory.

As shown in FIG. 1, the computer system 100 can be comprised of a user interface 102, a central processing unit (CPU) 106, a system bus 108, and a volatile primary memory 110 connected to and accessible by other portions of the computer system 100 through the system bus 108. The phrase "volatile memory" as used herein refers to memory that requires power to maintain stored information. The volatile primary memory 110 contains data stored in accordance with a table 130 format. The table 130 generally includes information associated with logical block addresses (described below in relation to FIG. 2C) for data stored in removable memory (e.g., on a disk) and corresponding physical block addresses (described below in relation to FIG. 2C) for data stored in non-volatile memory (e.g. a NAND flash memory, a disk-cache, and a solid-state-drive). Table 130 can be used by the computer system 100 to translate logical block addresses to physical block address, or vise versa.

The CPU 106 is comprised of a CPU memory 116. The CPU memory 116 is provided to store certain software to be accessed and run by the CPU 106 during a start-up (or boot) process. Such software includes, but is not limited to, device drivers (described below in relation to FIG. 3) and an operating system (described below in relation to FIG. 3). Start-up and boot processes are well known to those having ordinary skill in the art, and therefore will not be described herein.

Referring again to FIG. 1, the computer system 100 can also be comprised of removable memory 124 and a secondary memory device 114. The removable memory 124 can include, but is not limited to, a disk 126. The disk 126 is connected to and accessible by other portions of the computer system 100 through the system bus 108. The secondary memory device 114 is comprised of an application specific intergraded circuit (ASIC) 120 and a NAND flash memory 122. As should be understood that NAND flash memory 122 is non-volatile memory, i.e., memory that can maintain stored information even when power is not being supplied thereto. The NAND flash memory 122 will be described in more detail below in relation to FIGS. 2A-2C.

The ASIC 120 is configured to perform actions involving access to the NAND flash memory 122, use of the NAND flash memory 122, and management of data contained in the NAND flash memory 122. The NAND flash memory 122 has a BIOS-level option ROM (OROM) software program stored therein. The OROM software program will be described below in relation to FIG. 3. However, it should be understood that the OROM software program is provided for enabling (a) a re-set of at least a portion of a non-volatile memory after a power failure and (b) a synchronization of data stored in the NAND flash memory 122 and on the disk 126.

The user interface 402 is comprised of input devices, output devices, and software routines configured to allow a user to interact with and control software applications installed on the computer system 100. As such, the user interface 102 can facilitate a user-software interaction for turning on (or powering on) the computer system 100 and shutting down the computer system 100. The phrase "shut down" as used herein refers to a process of quitting all applications and powering off the computer system 100.

Referring now to FIG. 2A, there is provided a more detailed block diagram of the NAND flash memory 122 that is useful for understanding embodiments of the present invention. As shown in FIG. 2A, the NAND flash memory 122 is organized into blocks $BLOCK_1, BLOCK_2, \ldots, BLOCK_N$ of memory. Each of the memory blocks $BLOCK_1, BLOCK_2, \ldots, BLOCK_N$ comprises sixty-four (64) sequentially ordered pages. For example, memory block $BLOCK_1$ comprises sequentially ordered pages $P_1, P_2, \ldots, P_{64}$. Similarly, memory block $BLOCK_2$ comprises a next sequentially ordered set of pages $P_{65}, P_{66}, \ldots, P_{128}$. Likewise, memory block $BLOCK_K$ comprises a next sequentially ordered set of pages $P_{64K-M}, \ldots, P_{64K}$, and so on. It should be noted that a page of at least two memory blocks have a delineation marker (or minimum sequence value $SEQ_{MIN}$) stored therein. The phrase "minimum sequence value $SEQ_{MIN}$" as used herein refers to a sequence number of a last page $P_1, P_2, \ldots, P_N$ having data copied (or written) from the NAND flash memory 122 to the disk 126.

Referring now to FIG. 2B, there is provided a more detailed block diagram of a page $P_1, P_2, \ldots, P_N$. As shown in FIG. 2B, each of the pages is comprised of metadata 202 and data 204. The data 204 includes pre-selected data copied from the disk 126 and pre-selected data to be written to the disk 126. The data 204 is selected in accordance with a particular NAND flash memory 122 application. For example, the data 204 is selected as data that has a probability of being read from the disk 126 two or more times during a given computer system 100 process.

According to an embodiment of the invention, the metadata is comprised of twenty (20) bytes separated into multiple fields (as shown in FIG. 2C). Such fields include, but are not limited to, a valid or invalid marker 210, a dirty or clean marker 212, a physical address 214, a logical address 216, and a sequence number 218. The physical block address (PBA) 214 is a number representing an address of a memory location in the NAND flash memory 122. The logical block address (LBA) 216 is a number representing a memory location on the disk 126. The LBA 216 may comprise four (4) bytes. The sequence number 218 is a number representing the sequence value of a particular page $P_1, P_2, \ldots, P_N$. The sequence number 218 may comprise six (6) bytes. A valid marker 210 indicates that the data at a PBA of the NAND flash memory 122 is good, i.e., all data stored in the NAND flash memory 122 with a sequence number equal to an LBA is the same as data stored on the disk 126 at the LBA. In contrast, an invalid marker 210 indicates that all data stored in the NAND flash memory 122 with a sequence number equal to an LBA may be in conflict with data stored on the disk 126 at the LBA. In such a scenario, a read for the associated LBA should be serviced from the disk 126 and not the NAND flash memory 122. A dirty marker 212 indicates that the data has not been copied (or written) to the disk 126, i.e., the data at a PBA of the NAND flash memory 122 is not the same as the data at an LBA of the disk 126. A clean marker 212 indicates that the data has been copied (or written) to the disk 126, i.e., the data at a PBA of the NAND flash memory 122 is the same as the data at an LBA of the disk 126. Still, the invention is not limited in this regard. For example, the metadata can be absent of the PBA 214.

Figure 3:
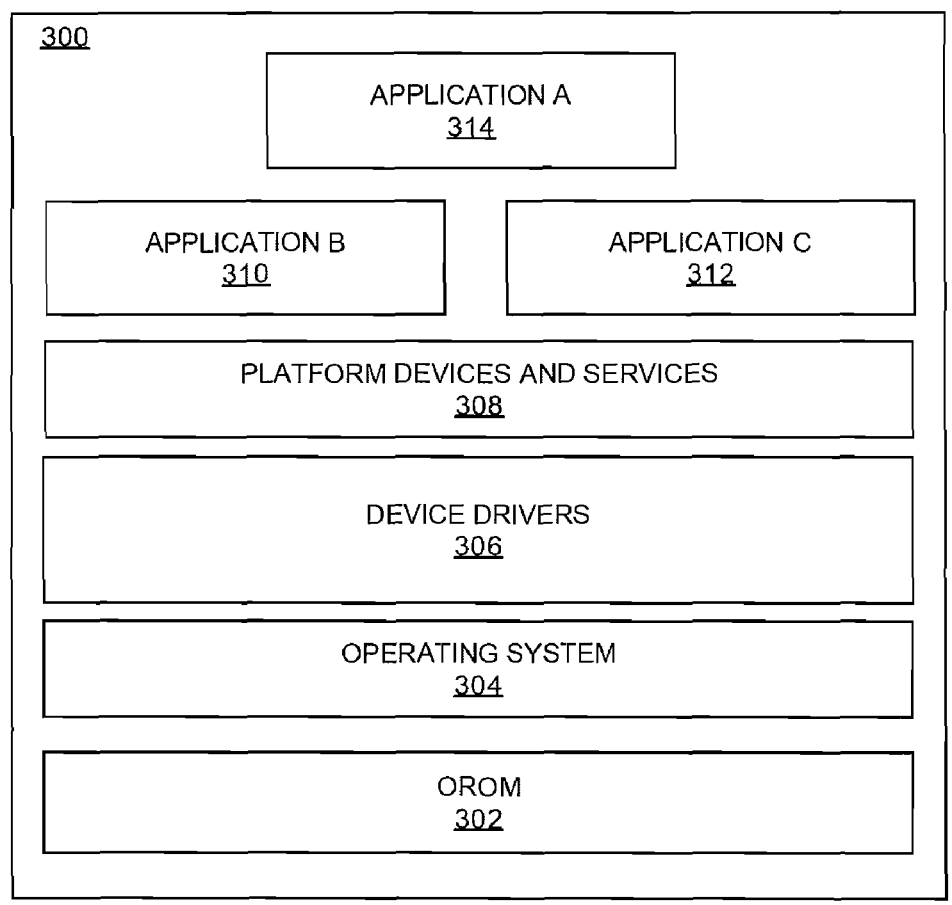
FIG. 3 is a block diagram of a software architecture of the computer system of FIG. 1.

Referring now to FIG. 3, there is provided a software architecture 300 for the computer system 100. The software architecture 300 can include levels of software programs. As shown in FIG. 3, the software architecture 300 includes a BIOS-level option ROM (OROM) software program, an operating system 304, device driver software programs 306, platform device and software programs 308, and software applications 310, 312, 314. The software programs of the architecture 200 are well known to those having ordinary skill in the art, and therefore will not be described in detail herein. However, a brief discussion of the software programs is provided to assist a reader in understanding embodiments of the present invention.

Referring again to FIG. 3, the OROM software program is generally software responsible for managing access to the NAND flash memory 122 before the operating system 304 and device drivers 306 load. The OROM software program may also be responsible for maintaining the integrity of data stored in the NAND flash memory 122. The term "load" as used herein means to copy data from a removable memory 124 device (such as the disk 126 of FIG. 1) to a secondary memory device 114. Notably, a program needs to be loaded before it can be executed. The term "load" also means copying a program into a place (e.g., the volatile primary memory 110, CPU memory 116, or NAND flash memory 122) where the program can be accessed and used by another program.

The operating system 304 is system software responsible for the direct control and management of the computer system 100 of FIG. 1. Typically, the operating system 304 manages basic computer system 100 operations, such as loading and running software applications 310, 312, 314. The operating system 304 software program is typically stored in a read-only memory, a hard drive or other type of memory.

A device driver software program 306 is generally software the computer system 100 uses to facilitate communications between hardware components. A device driver software program 306 can include code for managing access to hardware components, taking hardware components in and out of service (i.e., allocate or de-allocate), setting hardware component parameters, and communicating data between hardware components. For example, a device driver software program 306 can be provided for the secondary memory device 114. In such a scenario, the device driver software program can enable an initialization or reconstruction of table 130 of FIG. 1. Still, the invention is not limited in this regard.

The platform device and service software programs 308 are generally software programs that enable software components written in multiple computer languages to work together. The software applications 310, 312, 314 typically include programs designed for end users.

Figure 4:
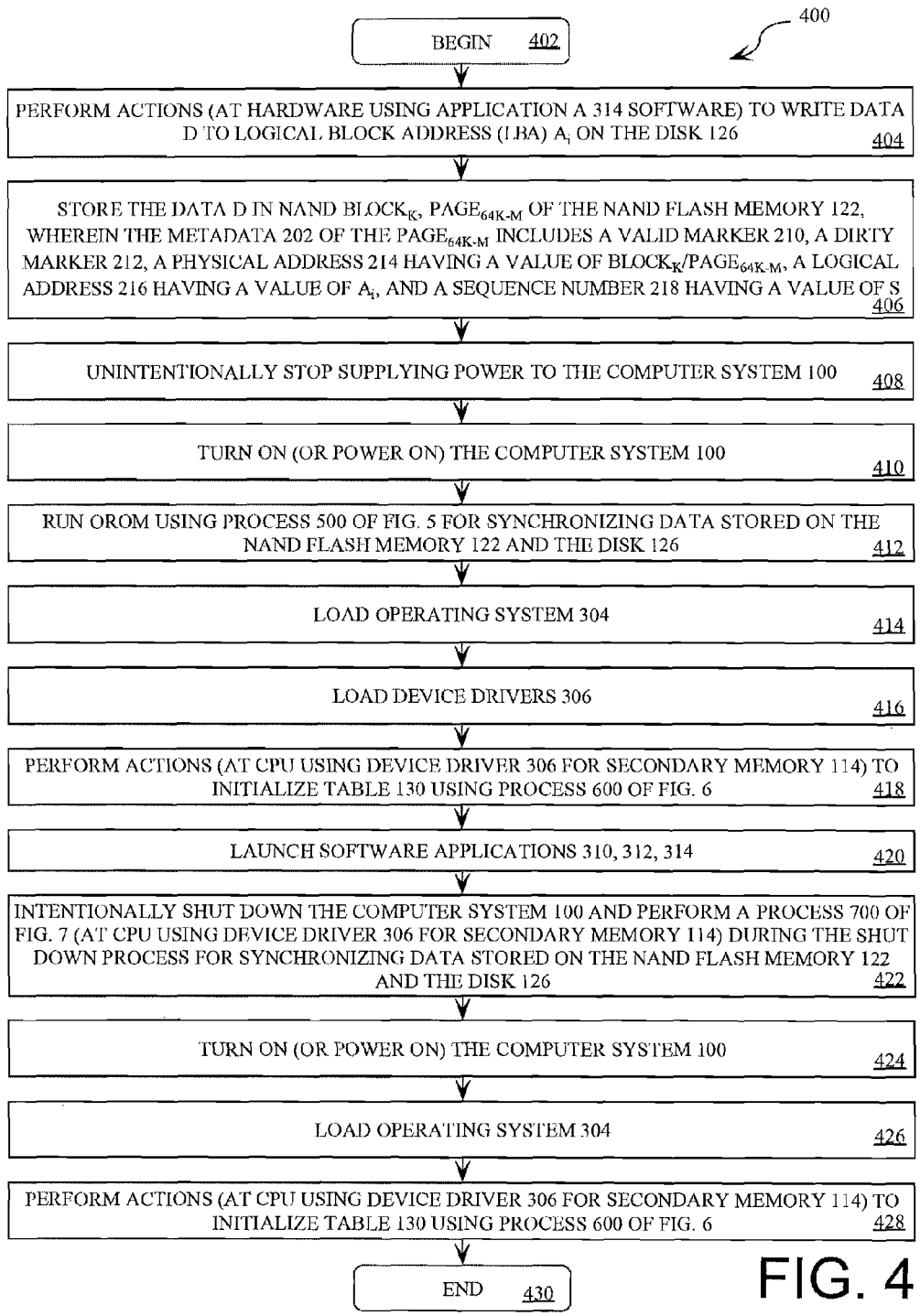
FIG. 4 is a flow diagram of a method for resetting at least a portion of non-volatile memory.

The following FIG. 4 and accompanying text illustrate a method 400 for resetting at least a portion of non-volatile memory after a power failure. It should be appreciated, however, that the method disclosed herein is provided for purposes of illustration only and that the present invention is not limited solely to the method shown.

Referring now to FIG. 4, the method 400 begins at step 402 and continues with step 404. In step 404, certain hardware of the computer system 100 performs actions to write data D to a logical block address (LBA) 216 (e.g., $A_i$) on the disk 126. Such hardware includes hardware configured to use the software application 314 of FIG. 3, such as the CPU 106, microprocessors (not shown), and application specific integrated circuits (not shown). It should be noted that the actions performed by the hardware may simply include a request to write data D to the LBA 216 on the disk 126. In such a scenario, the data D may not be written to the disk 126 during this step 404. Instead, the data D may be written to the disk in a subsequent step (not shown).

Referring again to FIG. 4, the method 400 continues with step 406. In step 406, the data D is stored in the NAND flash memory 122 of FIG. 1. More particularly, the data D is stored in page $P_{64K-M}$ of memory block $BLOCK_K$ of the NAND flash memory 122. The metadata 202 of page $P_{64K-M}$ includes a valid marker 210, a dirty marker 212, a PBA 214 having a value of $BLOCK_K/P_{64K-M}$, a LBA 216 having a value of $A_i$, and a sequence number 218 having a value of S.

Subsequent to the completion of step 406, the method 400 continues with step 408. In step 408, an unintentional power failure occurs thereby stopping the supply of power to the computer system 100. Thereafter, step 410 is performed where the computer system 100 is turned on (or powered on) by a user. Upon being turned on (or powered on), the OROM software program 302 is accessed and run for synchronizing data stored in the NAND flash memory 122 and on the disk 126. The OROM software program 302 can implement a method for synchronizing data stored on the NAND flash memory 122 and the disk 126. This method will be described below in relation to FIG. 5. Still, the invention is not limited in this regard. For example, a portion of the steps performed in the synchronization method (described below in relation to FIG. 5) can be implemented in an entirely hardware embodiment.

Referring again to FIG. 4, the operating system 304 and device drivers 306 are loaded in steps 414 and 416, respectively. Thereafter, the method 400 continues with step 418. In step 418, certain hardware of the computer system 100 performs actions to initialize table 130 of FIG. 1. This initialization can be provided using an initialization process described below in relation to FIG. 6. It should be understood that the initialization process is performed by the CPU 106 of FIG. 1 using a device driver software program 306 (described above in relation to FIG. 3) for the secondary memory device 114. In step 420, the software applications 310, 312, 314 are launched. The term "launch" as used herein means to start a program.

After launching the software applications 310, 312, 314, step 422 is performed where the computer system 100 is intentionally shut down by a user. It should be noted that a shut down process is performed in step 422 to force running software applications to close and to synchronize data stored in the NAND Flash memory 122 and the disk 126. Shut down process are well known to those having ordinary skill in the art, and therefore will not be described herein. However, it should be understood that the shut down process for synchronizing data will be described below in relation to FIG. 7. It should also be understood that the shut down process for synchronizing data is performed by the CPU 106 of FIG. 1 using a device driver software program 306 (described above in relation to FIG. 3) for the secondary memory device 114.

Subsequent to step 422, the method 400 continues with step 424. In step 424, the computer system 100 is turned on (or powered on) by a user. Upon being turned on (or powered on), the operating system 304 is loaded in step 426. Thereafter, step 428 is performed. In step 428, certain hardware of the computer system 100 performs actions to initialize table 130 of FIG. 1. This initialization can be provided using an initialization process described below in relation to FIG. 6. It should be understood that the initialization process is performed by the CPU 106 of FIG. 1 using a device driver software program 306 (described above in relation to FIG. 3) for the secondary memory device 114. After step 428, step 430 is performed where the method 400 ends.

Figure 5:
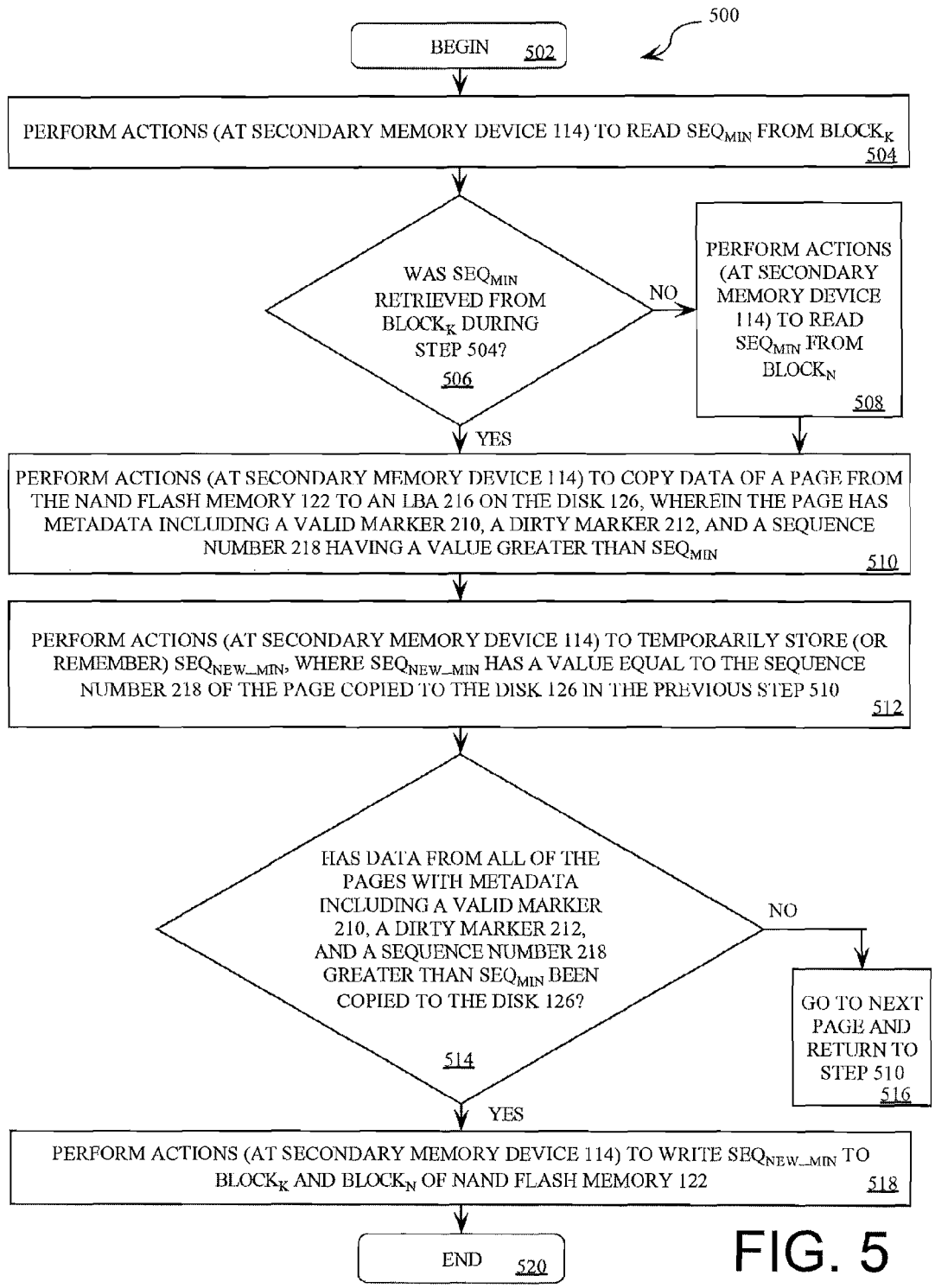
FIG. 5 is a flow diagram of a method for synchronizing data stored in NAND flash memory and removable memory after a power failure.

Referring now to FIG. 5, there is provided a method 500 for synchronizing data stored on the NAND flash memory 122 and disk 126. It should be noted that method 500 can be implemented entirely in hardware, entirely in software, or in both hardware/software. As shown in FIG. 5, the method 500 begins at step 502 and continues with step 504. In step 504, the secondary memory device 114 performs actions to read $SEQ_{MIN}$ from the memory block $BLOCK_K$ of the NAND flash memory 122. Thereafter, the method 500 continues with a decision step 506. If $SEQ_{MIN}$ was not retrieved from the memory block $BLOCK_K$ of the NAND flash memory 122 during step 504 [506:NO], then the method 500 continues with step 508. In step 508, the secondary memory device 114 performs actions to read $SEQ_{MIN}$ from the memory block $BLOCK_N$ of the NAND flash memory 122. Subsequent to obtaining $SEQ_{MIN}$, step 510 is performed.

If $SEQ_{MIN}$ was retrieved from memory block $BLOCK_K$ of the NAND flash memory 122 during step 504 [506:YES], then step 510 is performed. In step 510, the secondary memory device 114 performs actions to copy data of a page $P_1, P_2, \ldots, P_N$ from the NAND flash memory 122 to an LBA 216 on the disk 126. It should be understood that the page $P_1, P_2, \ldots, P_N$ has metadata 202 including a valid marker 210, a dirty marker 212, and a sequence number 218 having a value greater than $SEQ_{MIN}$. It should also be understood that step 510 does not involve writing metadata from the NAND flash memory 122 to the disk 126.

Referring again to FIG. 5, the method 500 continues with step 512. In step 512, the secondary memory device 114 performs actions to temporarily store a new minimum sequence value $SEQ_{NEW\_MIN}$ in system memory, such as the CPU memory 116 (described above in relation to FIG. 1) or volatile primary memory 110 (described above in relation to FIG. 1). The new minimum sequence value $SEQ_{NEW\_MIN}$ has a value equal to the sequence number 218 of the page having data copied therefrom in the previous step 510.

After step 512, the method 500 continues with a decision step 514. If data from all of the pages with certain metadata (including a valid marker 210, a dirty marker 212, and a sequence number 218 greater than the minimum sequence value $SEQ_{MIN}$) has not been copied to the disk 126 [514:NO], then step 516 is performed. In step 516, a next page is selected and the method 500 returns to step 510. It should be noted that data is copied from pages having an order of increasing sequence number. As such, the phrase "next page" refers to a page having a sequence number greater than a sequence number of the page having data copied therefrom in the previous step 512. Still, the invention is not limited in this regard. For example, data can alternatively be copied from pages having a random sequence order, a pseudo random sequence order, or an order of decreasing sequence numbers.

If data from all of the pages with certain metadata has been copied to the disk 126, then step 518 is performed. In step 518, the secondary memory device 114 performs actions to write the minimum sequence value $SEQ_{NEW\_MIN}$ to the NAND flash memory 122. In this regard, it should be understood that the new minimum sequence value $SEQ_{NEW\_MIN}$ is stored in a page $P_1, P_2, \ldots, P_N$ of at least two memory blocks $BLOCK_1$, $BLOCK_2, \ldots, BLOCK_N$ of the NAND flash memory 122. Thereafter, step 520 is performed where the method 500 ends.

Figure 6:
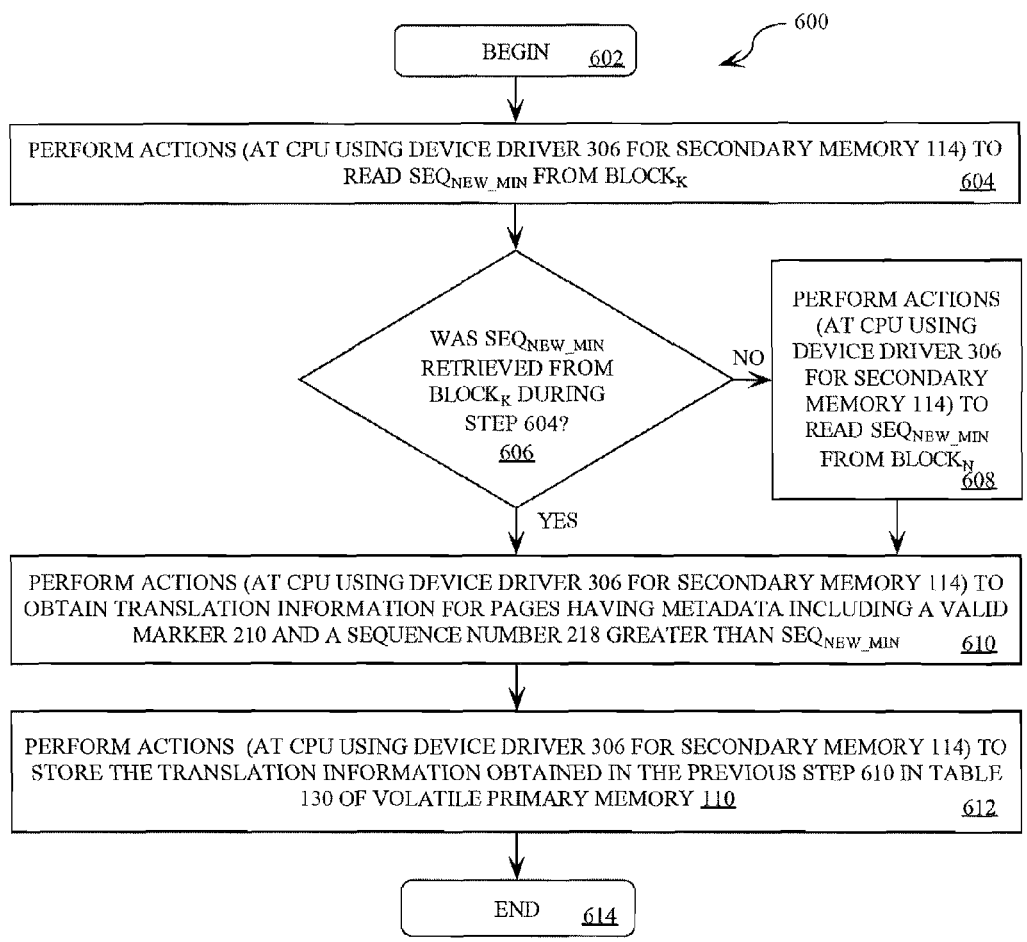
FIG. 6 is a flow diagram of a method for initializing the table shown in FIG. 1.

Referring now to FIG. 6, there is provided a method 600 for initializing the table 130 shown in FIG. 1. As shown in FIG. 6, the method 600 begins at step 602 and continues with step 604. In step 604, the CPU 106 performs actions to read the new minimum sequence value $SEQ_{NEW\_MIN}$ from a first memory block (e.g., $BLOCK_K$) of the NAND flash memory 122. Thereafter, a decision step 606 is performed. If the new minimum sequence value $SEQ_{NEW\_MIN}$ is not retrieved from the first memory block (e.g., $BLOCK_K$) [606:NO], then the method 600 continues to step 608. In step 608, the CPU 106 performs actions to read the new minimum sequence value $SEQ_{NEW\_MIN}$ from a second memory block (e.g., $BLOCK_N$) of the NAND flash memory 122. After obtaining the new minimum sequence value $SEQ_{NEW\_MIN}$, step 610 is performed.

If the new minimum sequence value $SEQ_{NEW\_MIN}$ is retrieved from the first memory block (e.g., $BLOCK_K$) [606: YES], then step 610 is performed for reconstructing table 130 of FIG. 1. In step 610, the CPU 106 performs actions to obtain translation information for pages $P_1, P_2, \ldots, P_N$ having metadata including a valid marker 210 and a sequence number 218 greater than the new minimum sequence value $SEQ_{NEW\_MIN}$. This translation information includes LBA 216 information and correlation information identifying PBAs 214 that correspond to respective LBAs 216. This translation information can enable the translation of LBAs to respective PBAs, or vise versa. Accordingly, the actions performed in step 610 can include (a) accessing the NAND flash memory 122, (b) retrieving metadata for a page $P_1, P_2, \ldots, P_N$, (c) determining whether the metadata includes a valid marker 210 and a sequence number 218 greater than the new minimum sequence value $SEQ_{NEW\_MIN}$, and (d) writing the PBA and LBA contained in the metadata to table 130 of FIG. 1.

Subsequent to step 610, step 612 is performed. In step 612, the CPU 106 performs actions to store the translation information in table 130 of the volatile memory 110 (described above in relation to FIG. 1). Thereafter, step 614 is performed where the method 600 ends.

Figure 7:
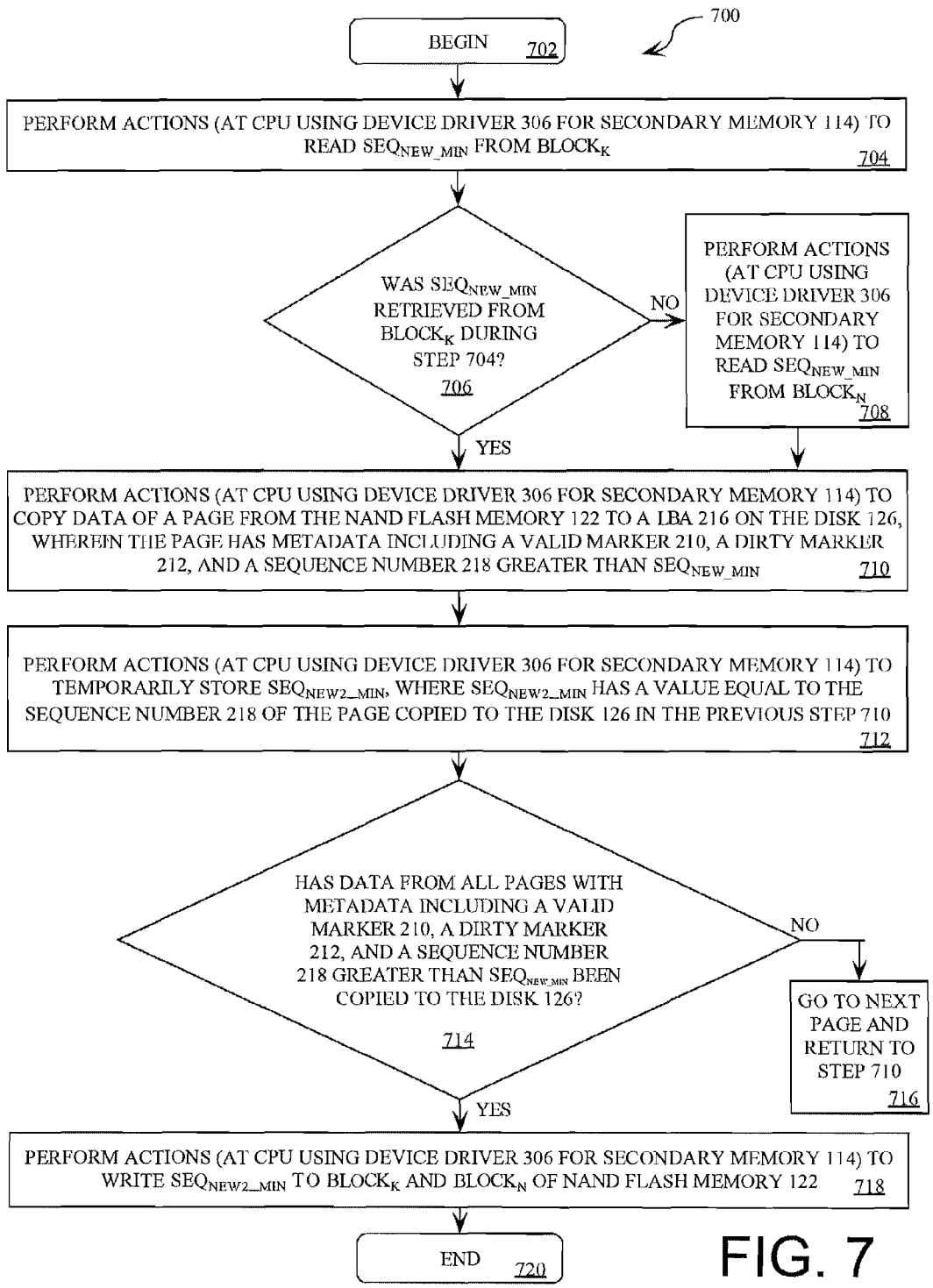
FIG. 7 is a flow diagram of a method for synchronizing data during a computer system shut down process.

Referring now to FIG. 7, there is provided a method 700 for synchronizing data during a computer system shut down process. The method 700 begins at step 702 and continues with step 704. In step 704, the CPU 106 performs actions to read the new minimum sequence value $SEQ_{NEW\_MIN}$ from a memory block $BLOCK_K$ of the NAND flash memory 122. Thereafter, a decision step 706 is performed. If the new minimum sequence value $SEQ_{NEW\_MIN}$ is not retrieved from the NAND flash memory 122 [706:NO], then the method 700 continues with step 708. In step 708, the CPU 106 performs actions to read the new minimum sequence value $SEQ_{NEW\_MIN}$ from a memory block $BLOCK_N$ of the NAND flash memory 122. Subsequent to obtaining the new minimum sequence value $SEQ_{NEW\_MIN}$, step 710 is performed.

If the new minimum sequence value $SEQ_{NEW\_MIN}$ is retrieved from the NAND flash memory 122 [706:YES], then step 710 is also performed. In step 710, the CPU 106 performs actions to copy data of a page from the NAND flash memory 122 to an LBA 216 on the disk 126. The page has metadata including a valid marker 210, a dirty marker 212, and a sequence number 218 greater than the new minimum sequence value $SEQ_{NEW\_MIN}$. Thereafter, step 712 is performed. In step 712, the CPU 106 performs actions to temporarily store a second version of the new minimum sequence value $SEQ_{NEW2\_MIN}$ in system memory, such as the CPU memory 116 (described above in relation to FIG. 1) or volatile primary memory 110 (described above in relation to FIG. 1). The second version of the new minimum sequence value $SEQ_{NEW2\_MIN}$ has a value equal to the sequence number 218 of the page having data copied therefrom in the previous step 710.

After step 712, the method 700 continues with a decision step 714. If data from all of the pages with certain metadata (including a valid marker 210, a dirty marker 212, and a sequence number 218 greater than the new minimum sequence value $SEQ_{NEW\_MIN}$) has not been copied to the disk 126 [714:NO], then step 716 is performed. In step 716, a next page is selected and the method 700 returns to step 710. It should be noted that data is copied from pages having an order of increasing sequence number. As such, the phrase "next page" refers to a page having a sequence number greater than a sequence number of the page having data copied therefrom in the previous step 712. Still, the invention is not limited in this regard. For example, data can alternatively be copied from pages having a random sequence order, a pseudo random sequence order, or an order of decreasing sequence numbers.

If data from all of the pages with certain metadata has been copied to the disk 126, then step 718 is performed. In step 718, the CPU 106 performs actions to write the second version of the new minimum sequence value $SEQ_{NEW2\_MIN}$ to the NAND flash memory 122. In this regard, it should be understood that the new minimum sequence value $SEQ_{NEW2\_MIN}$ is stored in a page $P_1, P_2, \ldots, P_N$ of at least two memory blocks $BLOCK_1, BLOCK_2, \ldots, BLOCK_N$ of the NAND flash memory 122. Thereafter, step 720 is performed where the method 700 ends.

In light of the forgoing description of embodiments of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it wilt not be used to interpret or limit the scope or meaning of the following claims.

We claim:

1. A method for reducing the number of writes in a non-volatile memory, the method comprising:
    writing data in a non-volatile memory;
    determining a set of data from said data in said non-volatile memory to be written to a removable memory operatively coupled to said non-volatile memory;
    copying said set of data to said removable memory from said non-volatile memory; and
    subsequent to said copying, writing a delineation marker to said non-volatile memory identifying said set of data as a last set of data in said non-volatile memory to be last copied to said removable memory,
    wherein metadata of said set of data in said non-volatile memory comprises at least one marker set as a specific marker type.

2. The method according to claim 1, wherein said delineation marker comprises a sequence number.

3. The method according to claim 1, wherein said at least one marker is set as a valid marker.

4. The method according to claim 1, wherein said at least one marker is set as a dirty marker.

5. The method according to claim 1, wherein said non-volatile memory comprises a NAND memory and said removable memory comprises a hard disk.

6. The method of claim 2, wherein said metadata of said set of data further comprises a sequence number, and the sequence number of the delineation marker is equal to the sequence number of said metadata of said set of data.

7. A system, comprising:
    a removable memory;
    a non-volatile memory coupled to said removable memory; and
    at least one processing device configured for (a) writing data in said non-volatile memory, (b) determining a set of data from said data in said non-volatile memory to be written to said removable memory, (c) copying said set of data to said removable memory from said non-volatile memory, and (d) subsequent to said copying, writing a delineation marker to said non-volatile memory identifying said set of data as a last set of data to be last copied to said removable memory,
    wherein metadata of said set of data in said non-volatile memory comprises at least one marker set as a specific marker type.

8. The system according to claim 7, wherein said delineation marker comprises a sequence number.

9. The system of claim 8, wherein said metadata of said set of data further comprises a sequence number, and the sequence number of the delineation marker is equal to the sequence number of said metadata of said set of data.

10. The system according to claim 7, wherein said at least one marker is set as a valid marker.

11. The system according to claim 7, wherein said at least one marker is set as a dirty marker.

12. The system according to claim 7, wherein said non-volatile memory comprises a NAND memory and said removable memory comprises a hard disk.

13. A method for reducing the number of writes in a non-volatile memory cache, comprising:
    writing data in a non-volatile memory cache into N different regions; and
    writing delineation markers to given regions in the non-volatile memory, said delineation markers:
        identifying a last set of data to be last written out from one of N different regions to a removable memory, and
        specifying that data in the N different regions up till and including said last set of data are no longer valid.

14. The method according to claim 13, wherein N is equal to one.

15. The method according to claim 13, wherein said delineation markers comprise sequence numbers.

16. The method according to claim 13, wherein different delineation markers are used for each of the N different regions or the same delineation marker is used for all N different regions.

17. A method for state modification of all or a portion of a non-volatile memory of a computer system, comprising:
    retrieving, from a non-volatile memory, a first minimum sequence number $SEQ_{MIN1}$ equal to a sequence number of a last page $P_N$ of a plurality of pages stored in the non-volatile memory, wherein the page $P_N$ includes data last copied from the non-volatile memory to a removable memory;
    copying data contained in a page $P_M$ of the plurality of pages stored in the non-volatile memory into the removable memory, the page $P_M$ having metadata comprising a sequence number greater than the first minimum sequence number $SEQ_{MIN1}$; and
    subsequent to the copying, writing, to the non-volatile memory, a second minimum sequence number $SEQ_{MIN2}$ equal to the sequence number contained in the metadata of the page $P_M$, wherein the second minimum sequence number $SEQ_{MIN2}$ indicates an update that the data contained in the page $P_M$ is the data last copied from the non-volatile memory to the movable memory.

18. The method according to claim 17, wherein the metadata of the page $P_M$ further comprises at least one of a valid marker and a dirty marker, wherein the dirty marker indicates that the data of page $P_M$ has not yet been copied to the removable memory.

19. The method according to claim 17, further comprising repeating the copying for pages Ps in the plurality of pages each having metadata comprising a sequence number, a valid marker, and a dirty marker, such that the sequence number of at least one of the pages Ps is greater than the second minimum sequence number $SEQ_{MIN2}$.

20. The method according to claim 19, further comprising writing, to the non-volatile memory, a third minimum sequence number $SEQ_{MIN3}$ equal to the sequence number contained in the metadata of a last page of the pages Ps having data copied therefrom.

21. The method according to claim 17, further comprising resetting all volatile data structures using the second minimum sequence number $SEQ_{MIN2}$.

22. The method according to claim 21, wherein the resetting further comprises obtaining translation information for one or more pages Ps in the plurality of pages each having metadata including a valid marker and a sequence number greater than the second minimum sequence number $SEQ_{MIN2}$.

23. The method according to claim 22, wherein the translation information comprises logical block address information for each page Ps and corresponding physical block address information for each page Ps.

24. The method according to claim 17, wherein the non-volatile memory comprises NAND flash memory or a solid state disk memory, and the removable memory comprises a hard disk.

25. A method comprising:
writing data in a non-volatile memory cache into N different regions; and
writing delineation markers to given regions in the non-volatile memory, said delineation markers specifying that data written to the N different regions up till said delineation markers are no longer valid indicating that the data written to the N different regions up till said delineation markers should be read from a removable memory operatively associated with the non-volatile memory.

26. The method according to claim 25, wherein N is equal to one.

27. The method according to claim 25, wherein said delineation markers comprise sequence numbers.

28. The method according to claim 25, wherein different delineation markers are used for each of the N different regions or the same delineation marker is used for all N different regions.

* * * * *